Oct. 24, 1944.   A. L. AYERS   2,361,166
TANDEM AXLE VEHICLE
Filed April 21, 1942   6 Sheets-Sheet 1
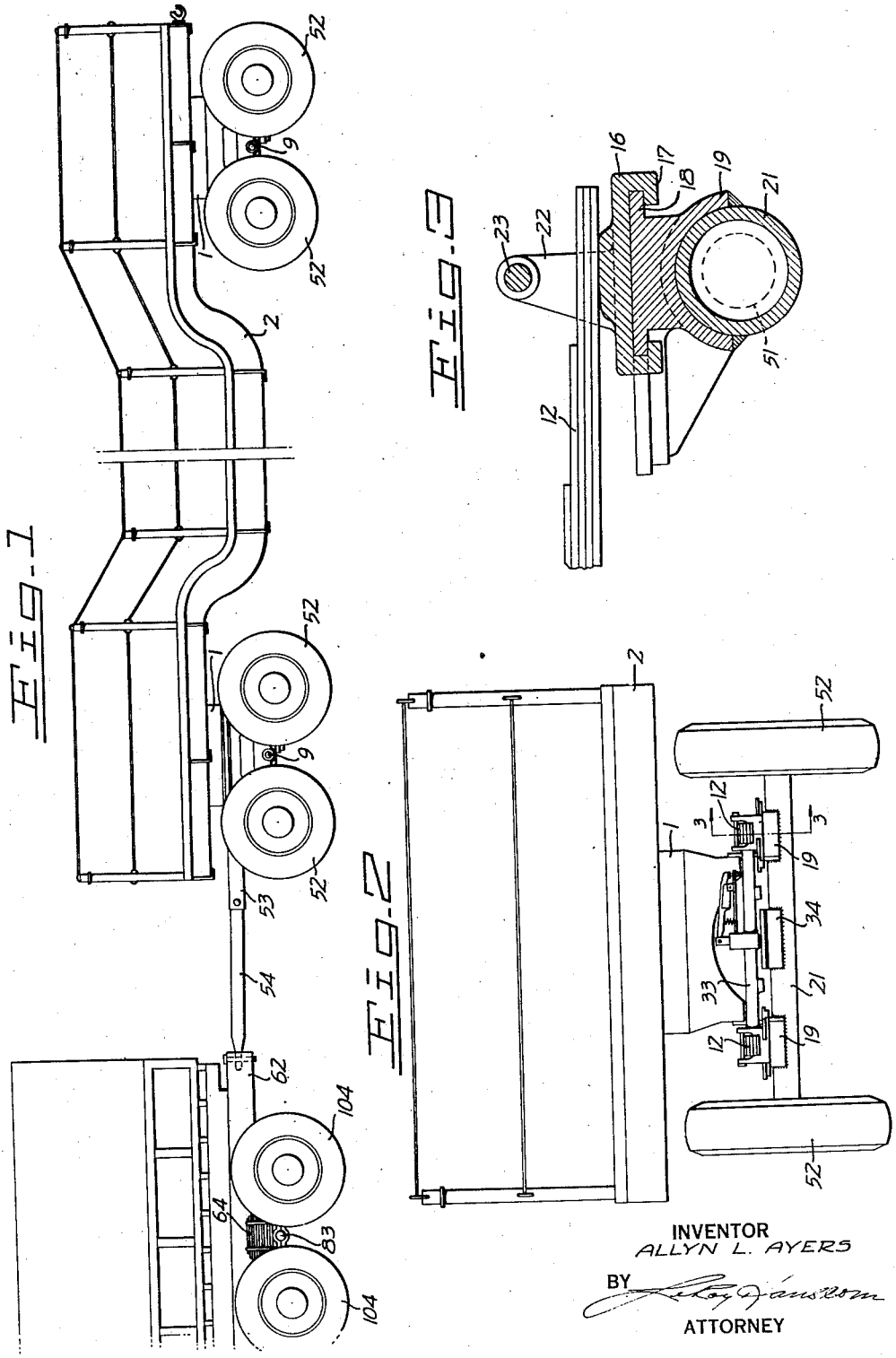
INVENTOR
ALLYN L. AYERS
BY
ATTORNEY

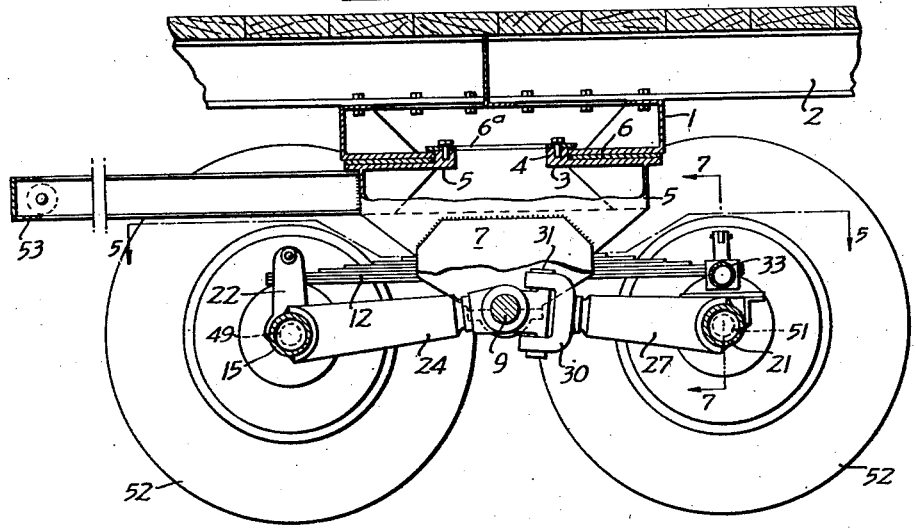
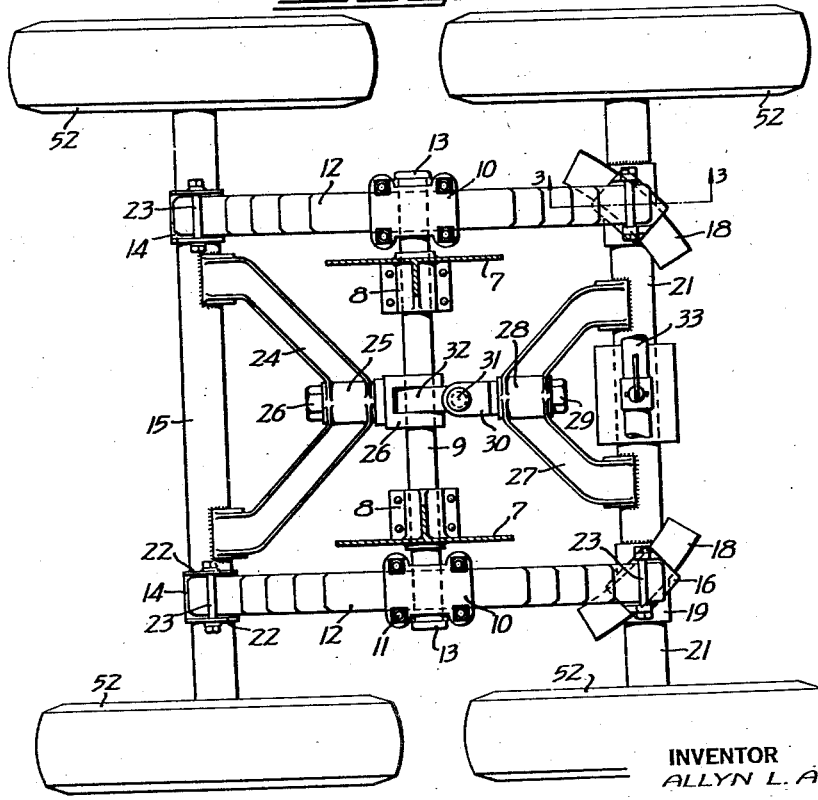

Oct. 24, 1944.  A. L. AYERS  2,361,166
TANDEM AXLE VEHICLE
Filed April 21, 1942  6 Sheets-Sheet 3

INVENTOR
ALLYN L. AYERS
BY
ATTORNEY

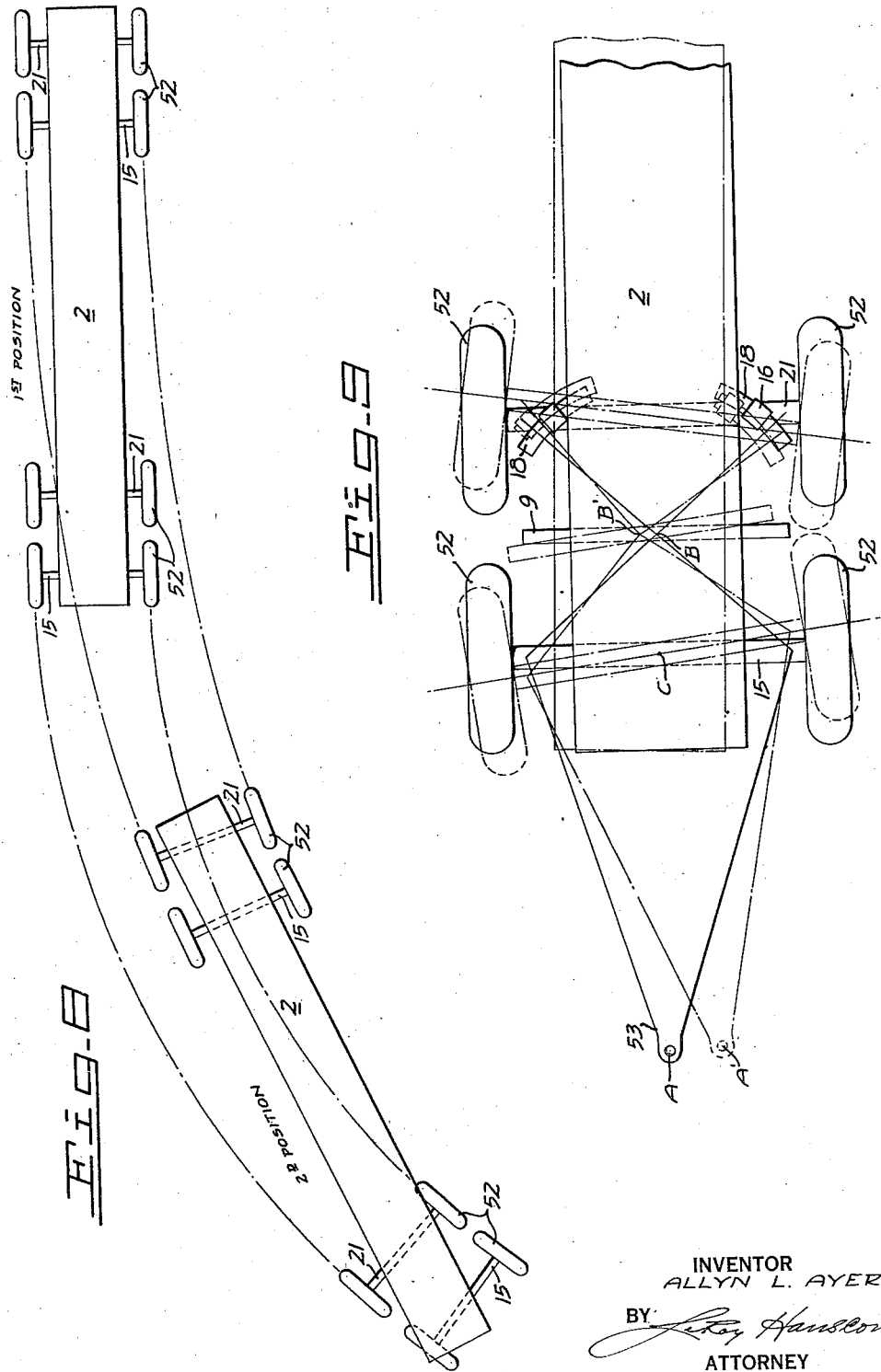

Oct. 24, 1944.        A. L. AYERS        2,361,166
TANDEM AXLE VEHICLE
Filed April 21, 1942        6 Sheets-Sheet 5

INVENTOR
ALLYN L. AYERS
BY
ATTORNEY

Oct. 24, 1944.  A. L. AYERS  2,361,166
TANDEM AXLE VEHICLE
Filed April 21, 1942  6 Sheets-Sheet 6
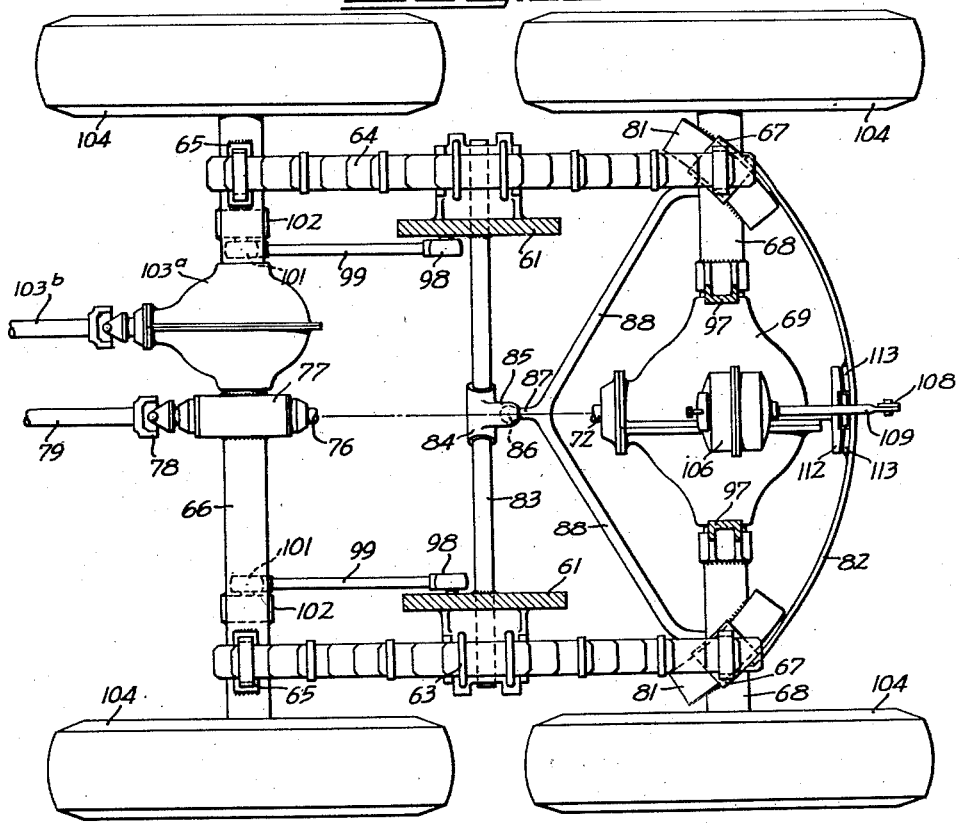
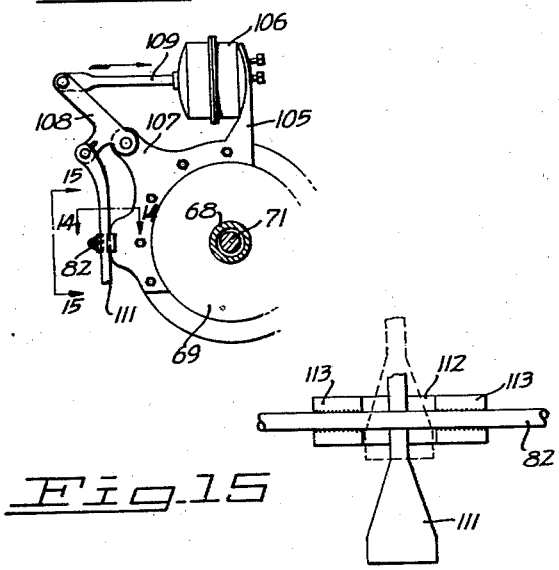
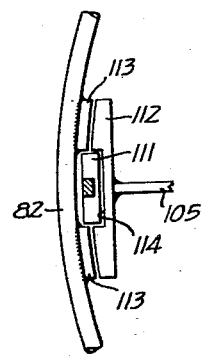
INVENTOR
ALLYN L. AYERS
BY
ATTORNEY Patented Oct. 24, 1944

2,361,166

UNITED STATES PATENT OFFICE 2,361,166

TANDEM AXLE VEHICLE

Allyn L. Ayers, Oakland, Calif.

Application April 21, 1942, Serial No. 439,826

20 Claims. (Cl. 280—124)

This invention relates in general to trucks and trailers and more particularly to means for permitting the rear axle of a set of tandem axles to track, trail, or follow the forward axle of the set and at the same time permit either or both axles to tilt or rock with respect to the chassis or frame which they support, so that the chassis or frame may be maintained substantially level even though the road bed or terrain be rough and irregular.

In my copending application Serial No. 387,117, filed April 7, 1941 (Patent No. 2,284,245), and of which the present application is a continuation in part, a trailing axle is disclosed, provided at either end with an arcuate pad or track for supporting complementary bearing pads carried by the vehicle springs and maintained in proper spaced relation by a tie rod.

One of the objects of this invention is the application of the principles disclosed in my previously filed application to a bogie for supporting the front end of a trailer.

Another object of this invention is the application of these principles to a set of tandem axles provided with means for equalizing the braking torque to which such axles may be subjected.

A further object of this invention is the application of said principles to a set of tandem axles in which either or both of said axles may be driven, and in which means is provided for equalizing the braking torque to which the axles may be subjected.

Still another object of this invention is the provision of means for locking the trailing axle of a set of tandem axles to a tie rod which maintains the bearing pads carried by the vehicle springs in spaced relation.

The invention possesses other advantageous features, some of which with the foregoing will be set forth at length in the following description where those forms of the invention which have been selected for illustration in the drawings accompanying and forming a part of the present specification are outlined in full. In said drawings, several forms of the invention are shown, but it is to be understood that it is not limited to such forms, since the invention as set forth in the claims may be embodied in many other forms.

Referring to the drawings:

Figure 1 is a side elevation diagrammatically illustrating the rear end of a truck and the trailer attached thereto, in which the objects of my invention have been embodied.

Figure 2 is a rear end elevation of the trailer shown in Figure 1.

Figure 3 is an enlarged detail section taken on the lines 3—3 of Figures 2 and 5.

Figure 4 is a vertical midsection taken through the bogie supporting the front end of the trailer shown in Figure 1.

Figure 5 is a horizontal section taken on the line 5—5 of Figure 4.

Figure 8 diagrammatically illustrates the path defined by the wheels of the front and rear bogies of the trailer shown in Figure 1 when the trailer is traveling counterclockwise in a curved path.

Figure 9 diagrammatically illustrates the various movements of the fixed and trailing axles of the bogie supporting the front end of the trailer shown in Figure 1, as well as the movement of the forward end of the chassis of the trailer when the trailer is moving in a curved path.

Figure 10:
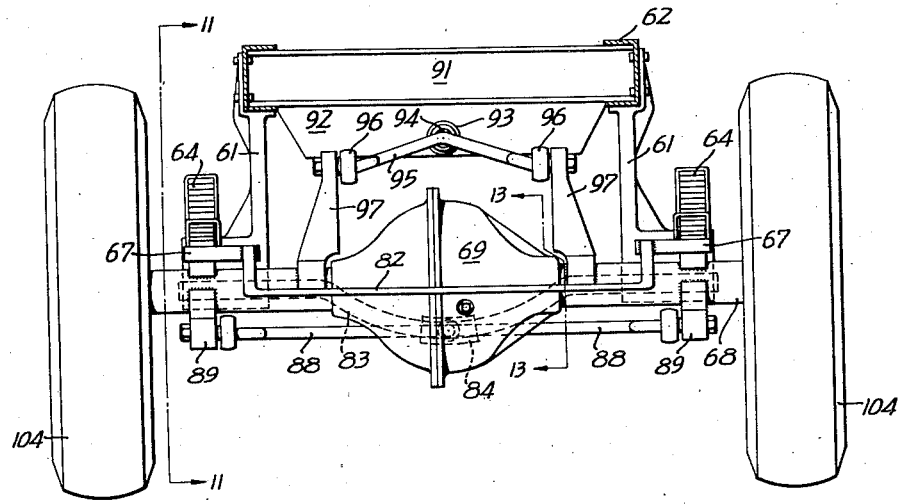

Figure 10 is an end elevation of the rear end of the truck shown in Figure 1 with a portion of the mechanism for locking the trailing axle parallel with the fixed axle, omitted.

Figure 11:
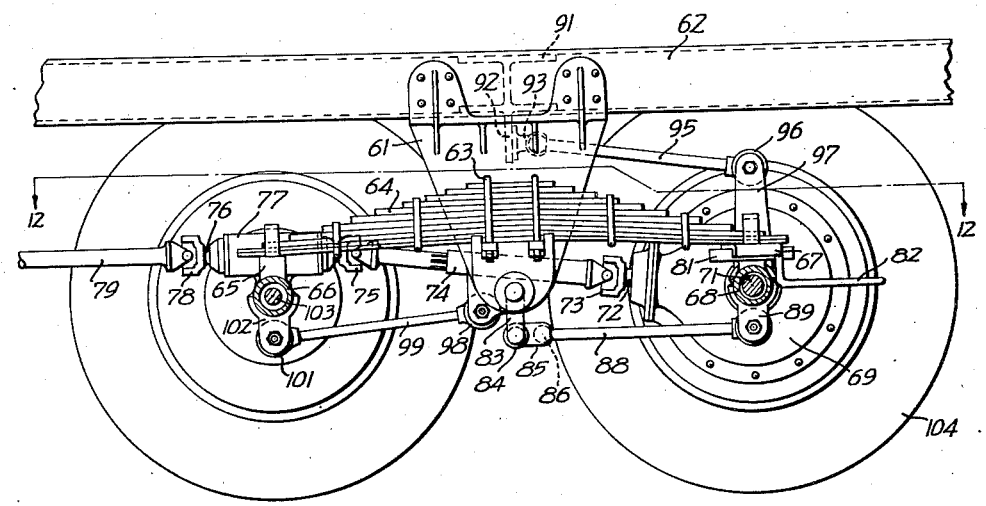

Figure 11 is a vertical section taken on the line 11—11 of Figure 10.

Figure 12 is a horizontal section taken on the line 12—12 of Figure 11.

Figure 13 is an enlarged vertical section taken on the line 13—13 of Figure 10.

Figure 14 is an enlarged horizontal section taken on the line 14—14 of Figure 13.

Figure 15 is a detail end elevation taken on the line 15—15 of Figure 13.

In the truck and trailer combination shown in Figure 1, the rear end of the truck and the forward and rear ends of the trailer are each provided with a set of tandem axles in which the rear axle of each set is a trailing or tracking axle. In each of the three sets of tandem axles shown, means is provided for equalizing the braking torque to which each axle may be subjected, and means is provided in conjunction with each set of axles for locking the trailing axle in parallelism with its associated fixed axle. Furthermore, the bogie constituting the support for the front end of the trailer is secured to the trailer by means of a fifth wheel which permits the bogie to turn as a unit in relation to the trailer chassis.

Construction of forward bogie of the trailer

Figure 7:
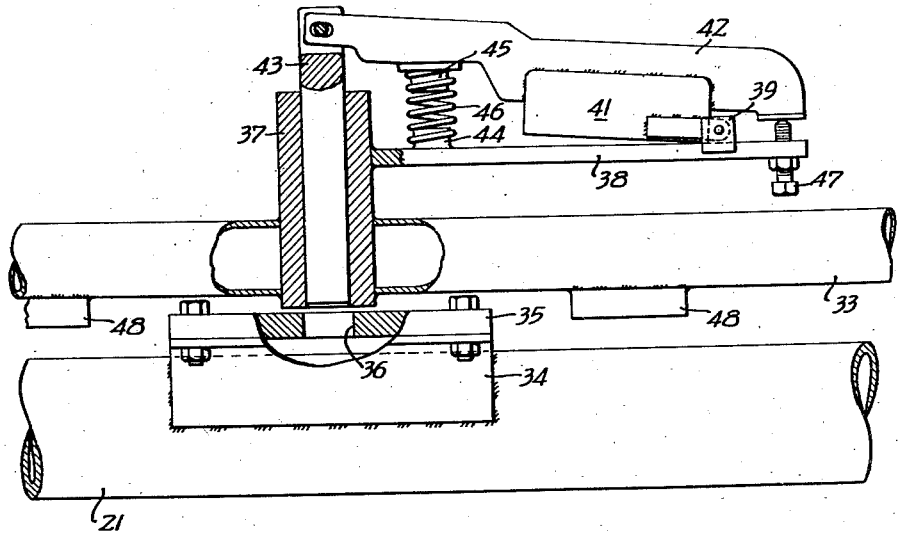
Figure 7 is an enlarged vertical section taken on the line 7—7 of Figure 6, illustrating the mechanism for locking the trailing axle parallel with the fixed axle.

Referring now more particularly to Figures 4, 5, and 7 showing the construction of the front bogie for supporting the front end of the trailer:

As shown in Figure 4, a frame 1 is bolted to the under side of the trailer chassis 2. The frame 1 is provided with a central circular opening 3 in which is journaled the hub 4 of a fifth wheel 5. Disposed between the fifth wheel 5 and the frame 1 is a wear plate 6, and secured to the upper face of the hub 4 is an annular plate 6ª, the outer periphery of which overhangs the frame 1, thereby securing the fifth wheel to the frame. Welded to each side of the fifth wheel 5 and depending therefrom is a bracket 7 provided with bearings 8 in which is journaled a cross shaft 9. Journaled on each end of the cross shaft is a spring saddle 10 to which is secured by U-bolts 11 a spring leaf 12. Lateral movement of the cross shaft 9 with respect to the spring saddles 10 is prevented by caps 13 threaded on each end of the cross shaft. The forward end of each of the springs 12 slidably reclines on a spring saddle 14 welded to the forward non-steering axle 15. The rear end of each of the springs 12 slidably reclines on an arcuate spring saddle or pad 16 which, as best shown in Figure 3, is provided on its under side with a channel 17. The arcuate spring saddle or pad 16 in turn slidably reclines on an arcuate bearing pad 18 accommodated within the channel 17 and formed with an axle saddle 19 by means of which it is welded to the axle 21. Each of the spring saddles 14 and 16 is provided on either side with forwardly extending ears 22, and secured to these ears above the ends of the springs is a bolt 23 for limiting the vertical movement of the ends of the springs with respect to their associated spring saddles.

Welded to the axle 15 on the inside of the spring saddles 14 is a yoke 24 provided at its inner end with a sleeve 25 for the reception of a bifurcated swivel bolt 26, the head of which is journaled on the cross shaft 9. In a similar manner a yoke 27 is welded to the axle 21 and is provided on its inner end with a sleeve 28 for the reception of a swivel bolt 29 formed with a bifurcated head 30. Swiveled to the bifurcated head 30 on a pin 31 is a bearing 32, journaled on the cross shaft 9 and straddled by the bifurcated head of the swivel bolt 26. This construction therefore permits a universal movement of the axle 21, leaving it free to move about the axis of the cross shaft 9, about the axis of the pin 31, and about the axis of the swivel bolt 29. In contrast to this universal movement of the axle 21, the axle 15 is incapable of swinging movement in a horizontal plane, and in this respect may be considered as a fixed or non-steering axle, although it is free to swing about the axis of the cross shaft 9 and also free to swing about the axis of the swivel bolt 26.

Extending between the spring saddles or pads 16 and welded thereto is a tie rod 33 which serves to hold the arcuate spring pads in a fixed spaced relation with respect to each other and, as best shown in Figure 7, enables the tie rod to be locked to the rear axle, with the rear axle parallel to the forward axle. To this end a saddle 34 is welded to the rear axle 21, and bolted to the saddle 34 is a plate 35 formed with a vertical opening 36. Welded to the tie rod 33 in registration with the opening 36 is a sleeve 37 provided with a bracket 38. Swiveled to upwardly extending lugs 39 carried by the bracket 38 is an electromagnet 41 which in turn is welded to an arm 42. Pivoted to the outer end of the arm 42 and depending therefrom is a rod 43 slidably disposed within the sleeve 37. Extending upwardly from the bracket 38 is a lug 44, and depending from the arm 42 in registration with the lug 44 is a lug 45. Secured to these lugs is a compression spring 46 serving to maintain the rod 43 in its elevated position except when the magnet 41 is energized. The outer end of the bracket 38 carries an adjusting set screw 47 for adjusting the clearance between the lower end of the rod 43 and the lower end of the sleeve 37. When it is desired to back the trailer, the trailing axle 21 is aligned in parallelism with the forward axle 15 by pulling the vehicle forward a foot or two so that the sleeve 37 is in registration with the opening 36 formed in the plate 35. The magnet 41, which has already been energized, then operates to engage the lower end of the rod 43 within the opening 36, thus locking the tie rod 33 to the trailing axle 21. The amplitude of the swinging movement of the rear axle 21 with respect to the tie rod 33 is limited by spaced stop members 48 which are engaged by either end of the plate 35.

Formed as an integral part of the axles 15 and 21 are spindles 49 and 51, respectively, which carry at their outer ends tired wheels 52. Welded to the frame 5 is a yoke 53, to which may be swiveled a draw bar or tongue 54, which in turn may be swiveled to the rear end of the truck as shown in Figure 1. Although as indicated in Figures 4 and 5, the axles 15 and 21 are dead or non-driven, live axles can be used, and in that event the reference numerals 15 and 21 would indicate axle housings and the reference numerals 49 and 51 live axles.

*Construction of the rear bogie of the trailer*

Figure 6:
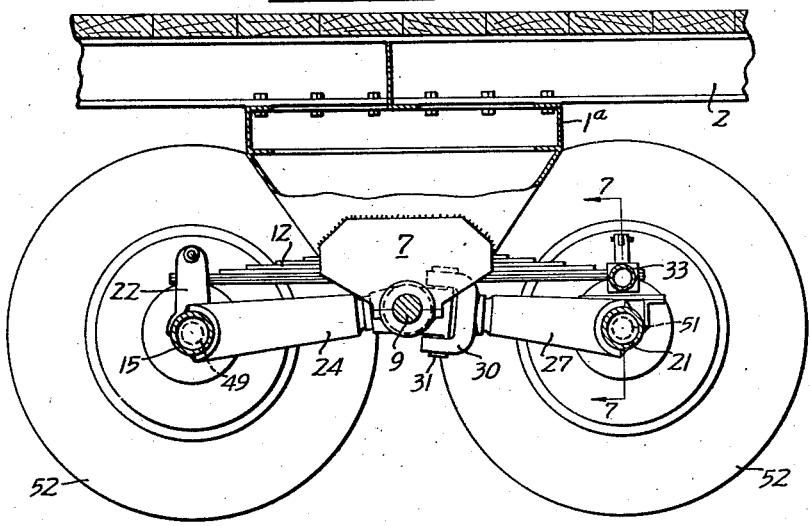
Figure 6 is a vertical midsection of the bogie supporting the rear end of the trailer shown in Figure 1.

The bogie for supporting the rear end of the trailer is shown in Figure 6, and since with one exception the construction of this bogie is identical with the construction of the forward trailer bogie above described, the same reference numerals have been used to designate corresponding elements. The bogie shown in Figure 6, however, is provided with a frame 1ª to which brackets 7 are directly connected, and in this respect differs from the bogie shown in Figure 4, and in which a fifth wheel 5 is operatively disposed between the frame 1 and the brackets 7. In other words, the bogie shown in Figure 6 is formed by simply making the frame 1 and the fifth wheel 5, of the bogie shown in Figure 4, integral with each other.

*Action of the trailer and trailer bogies*

The action of the front and rear bogies of the trailer when the trailer is being pulled counterclockwise in a curved path, is as diagrammatically illustrated in Figures 8 and 9. As shown in Figure 8, the front bogie turns as a unit relative to the trailer chassis and in addition to this the rear axles of both the forward and rear bogies are cocked with respect to the forward axles of each bogie, so that although the rear bogie does not track the forward bogie, the rear wheels of each bogie track its forward wheels. This action is shown in greater detail in Figure 9, wherein the position of the chassis and the forward bogie when the trailer is being drawn forward in a straight line is shown in full lines, and wherein the dotted lines indicate the position of the chassis and the fixed and trailing axles of the forward bogie when the forward bogie has been turned counterclockwise about its fifth wheel. To understand this action better, it should be kept in mind that each of the trailing axles 21 of each bogie functions as a caster which always tends to align itself at right angles to the direction of movement of its pivotal point (the axis of the pin 31). It should also be kept in mind that although when the trailer is traveling in a curved path every point on the trailer is also traveling in a curved path, momentarily each of these points may be considered as traveling along a line tangential to its actual locus.

The result of laterally displacing the coupling point A of the yoke 53 when the trailer is standing still may be considered independently of the action of the two bogies when the trailer is in motion. If the trailer were suspended in the air, a counterclockwise pull on the coupling A of the yoke 53 would simply cause the front bogie to rotate about the axis B of the fifth wheel 5. However, when the trailer is resting on the ground, the traction or friction between the ground and the wheels carried by the forward axle 15 resists the movement of the bogie about the axis B. Under these conditions a counter-clockwise pull on the end of the yoke causes the yoke and all of the parts to which it is attached to turn counter-clockwise about an imaginary fulcrum point C lying somewhere along the axis of the axle 15 intermediate its ends. Since the fifth wheel 5 is fixed to the yoke 53 in so far as lateral movement is concerned, the counter-clockwise movement of the coupling point A about the imaginary fulcrum point C causes the axis B of the fifth wheel to assume the position B'. For all practical purposes, the axis of the pin 31 (Figure 5) is coincident with the axis of the fifth wheel 5. Consequently the pivotal point of the trailing axle 21 may be considered as having been displaced from the point B to the point B'. This therefore results in cocking the rear axle 21 to its dotted position as shown in Figure 9, which can readily be done without any frictional drag due to the fact that the axle 21 is free to rotate about the pin 31. The front end of the chassis 2 is simultaneously displaced in a clockwise direction about an axis lying along the forward fixed axle 15 of the rear bogie. It will therefore be seen that by mounting the front bogie on a fifth wheel, the yoke 53 forms an articulated structure with the front end of the chassis 2 and that due to this articulated structure and to the fact that the rear axle 21 of the front bogie is free to pivot about a point intermediate the forward and rear axles of this bogie, the forward end of the trailer may be readily displaced laterally without skidding any of the wheels of the front bogie and without the use of any great amount of force. Without this feature, there would be considerable difficulty in aligning the tongue of the trailer with the rear coupling of a truck for the purpose of connecting the two vehicles.

As above stated, the counter-clockwise movement of the yoke 53 results in what may be considered as a clockwise movement of the chassis 2 about a pivotal point located along the forward axle 15 of the rear trailer bogie. Theoretically, this would result in turning the axle 21 of the rear bogie counter-clockwise to a very slight degree. However, when the trailer is moving in a curve as shown in Figure 8, the chassis 2 is continuously pivoting about its rear axle 15 in a counter-clockwise direction and consequently when the vehicle is in motion, the outer wheels of each of the axles 21 would be lagging behind its inner wheel, as shown in both Figures 8 and 9.

*Construction of the rear bogie of the truck*

As shown in Figures 10 to 15, inclusive, the bogie supporting the rear end of the truck comprises a bracket 61 bolted to and depending from each side of the chassis 62. Secured to each of the brackets 61 by U-bolts 63 is a spring leaf 64, the forward ends of which slidably recline on spring saddles 65 welded to the forward fixed axle housing 66. The rear ends of the leaf springs 64 slidably recline on arcuate spring saddles or pads 67. Secured to and forming an integral part of the axle housing 68, is a differential housing 69. Disposed within the axle and differential housings 68 and 69 respectively, is a live axle 71 driven by a differential not shown but contained within the differential housing 69 and which in turn is driven by a stub shaft 72 connected by a universal joint 73 with a splined shaft 74 (Figure 11). The splined shaft 74 is connected through a universal joint 75 with a shaft 76 journaled in a bearing 77 welded to the forward axle housing 66. Secured to the forward end of the shaft 76 through a universal connection 78 is a drive shaft 79 extending forward of the truck and connected to a transmission, not shown.

The arcuate spring saddles or pads 67 slidably recline on arcuate bearing pads 81 welded to the rear axle housing 68. The details of construction of the complementary arcuate pads 67 and 81 may be in all respects similar to the arcuate pads 16 and 18 shown in Figure 3. Surrounding the outer end of the differential housing 69 is an arcuate tie rod 82, the ends of which are welded to the arcuate spring saddles or pads 67. The purpose of this tie rod is to retain the arcuate pads 67 in a predetermined spaced relation with respect to each other and, as will be later explained, to enable the rear axle housing 68 to be locked parallel with the forward non-steering axle housing 66.

Welded to and extending between the downwardly extending brackets 61 is a downwardly curved, arcuate guide member 83. Slidably disposed on the guide member 83 is a sleeve 84 provided with a ball socket 85 to which is secured by means of a ball 86 a torque yoke 87 formed by rearwardly diverging arms 88. The arms 88 straddle the differential housing 69 and are connected at their outer ends through a flexible rubber joint with downwardly extending lugs 89 welded to the lower side of each end of the axle housing 68.

Welded to an H-beam 91 forming part of the chassis 62 and centered between the axle housings 66 and 68, is a cross member 92. Secured to the rear face of this cross member on the center line of the chassis 62 is a ball socket 93. Secured within this ball socket by means of a ball 94 is a yoke 95, the outer ends of which are flexibly secured through ball sockets 96 to upwardly extending arms 97 welded to the rear axle housing 68.

The complementary arcuate pads 67 and 81, the yokes 87 and 95, and the flexible connections between the differential and the transmission, permit the rear axle housing 68 to swing about a central vertical axis intermediate the forward and rear axle housings 66 and 68, and at the same time permit the rear axle housing 68 to move vertically and tilt with respect to the chassis 62. Furthermore, the yokes 87 and 95 transmit the power from the driving wheels to the chassis, and transmit the braking and driving torques to which the rear axle may be subjected, to the chassis. Since the rear axle housing is connected through the arms 97 and yoke 95 with the ball and socket joint carried on the cross member 92, a sliding connection between the sleeve 84 and the guide member 83 is essential in order to give the rear axle housing the freedom of movement which is required of it, that is, to swing with respect to the arcuate pads 67, to move vertically with respect to the chassis, and to tilt with respect to the chassis.

To the lower ends of the downwardly extending brackets 61 through rubber joints 98 are forwardly extending torque rods 99, the forward ends of which are pivoted through rubber joints 101 to downwardly extending lugs 102 welded to each end of the forward axle housing 66. These torque rods transmit to the chassis the driving and braking torques to which the forward axle housing may be subjected, and serve to balance or equalize the opposed driving and braking torques transmitted to the chassis at this point through the torque yokes 87 and 95.

The axle housing 66 carries a live axle 103 driven by a differential (not shown) accommodated within the differential housing 103ª and which in turn is actuated through a drive shaft 103ᵇ by the truck transmission. Mounted on axles 71 and 103 are rubber tired wheels 104. Although not shown, each of these wheels preferably carries a brake.

*Mechanism for locking the trailing truck axle*

Bolted to the differential housing 69 is an arcuate bracket 105 which carries a vacuum booster 106 and is provided with an upwardly and outwardly extending arm 107. Pivoted to the arm 107 is a bell crank 108 linked at its outer end to a connecting rod 109 actuated by the vacuum booster 106. Since the inner end of the rod 109 is secured to a rubber diaphragm within the vacuum booster, its outer end is free to follow the bell crank. Pivoted to the bell crank 108 intermediate its ends is an upwardly tapered or wedge-shaped locking member 111 arranged for vertical sliding movement between the arcuate connecting rod 82 and a plate 112 welded to the arcuate support 105. Welded to the connecting rod 82 is a pair of laterally spaced guide members 113, and formed in the plate 112 is a vertical recess 114 which, together with the spaced guide members 113, forms a vertical channel for the accommodation of the wedge-shaped locking member 111. The width of this channel and the minimum width of the locking member 111 are such that with the locking member 111 in the position shown in Figure 15, the trailing axle housing 68 is permitted to swing relative to the tie rod 82 to the extent permitted by the clearance between the forward and rear wheels 104. If the rear axle is cocked with respect to the forward axle, it can be brought into parallelism therewith by causing the wedge-shaped locking member 111 to move upwardly against the inner side of one if the stop members 113, thereby forcing the stop members 113 into alignment with the plate 112. By retaining the wedge-shaped locking member 111 in its uppermost position, the axle housing 68 will thereby be locked in parallelism with the forward fixed axle housing 66, as is required when it is desired to back the vehicle.

Although as shown in Figures 5 and 12 it is preferable, in order to reduce friction, to make the pads 16 and 18 and 67 and 81 relatively short, this is not essential. The two spaced pads 18 shown in Figure 5 can be made in the form of a single, substantially semi-circular pad, and likewise the two spaced pads 16 can be made as a single substantially semi-circular pad serving as a tie rod as well as a pad. A similar change can be made with respect to the pads 67 and 81 and the tie rod 82 shown in Figure 12. Nor is it essential that any of these pads be of arcuate form. All that is necessary is that the lower pads or pad (if only one continuous pad is used) be of sufficient area and form to permit the upper pad or pads to describe an arcuate path over the lower pad or pads. In effect, the contacting pads simply constitute a fifth wheel for the rear axle of each bogie, means being provided for locking together the two relatively movable elements of this fifth wheel. As shown in Figure 12, the connecting rod 82 is simply a continuation of the two spaced pads 67. The forward trailer bogie may be considered as including two fifth wheels, one by which the bogie assembly is articulated to the trailer chassis, and one by which the rear axle of the bogie is articulated to the bogie. Although as illustrated and described only the front bogie assembly is articulated to the chassis, in some cases it is desirable to articulate both bogies to the chassis, and to provide means for locking either or both bogies to the chassis so that either end of the vehicle can be made to function as its leading or forward end.

Although the forward axle of each bogie is free to tilt relative to its bogie in a vertical plane, due to the fact that it is carried at either end by springs, it is incapable of horizontal pivotal movement with respect to its bogie, and consequently the forward axle of each bogie will be referred to in the appended claims as a "fixed" axle. This relation of course holds true even though the bogie may be mounted to the frame of the chassis by a fifth wheel, and regardless of whether the "fixed" axle is a "live" or "dead" axle.

I claim:

1. In a vehicle: a frame; supporting means for said frame including forward and rear tandem axles, the forward axle being fixed against any substantial movement in a horizontal plane; means for articulating the rear axle to said frame at a point intermediate said axles for limited swinging movement about said point; and torque transmitting means connecting said axles to said frame at a point intermediate said axles for transmitting braking and driving reactive forces to said frame.

2. In a vehicle: a frame; supporting means for the frame including forward and rear tandem axles and load transmitting means interposed between the frame and axles, the forward axle being fixed against any substantial movement in a horizontal plane; means for articulating the rear axle to said frame for limited pivotal movement about a vertical axis intermediate said tandem axles; torque transmitting means connecting said axles to said frame at a point intermediate said axles for transmitting braking and driving reactive forces to said frame, and controllable means for locking the rear axle parallel with the forward axle to prevent swinging of the former during backing.

3. In a vehicle: a frame; supporting means for the frame comprising forward and rear tandem axles and load transmitting means interposed between the frame and axles, the forward axle being fixed against any substantial movement in a horizontal plane; spaced bearing pads carried by the rear axle; other pads reclining on said bearing pads and movable with respect thereto and associated with said load transmitting means; means for holding said other pads in fixed spaced relation with respect to each other; and torque transmitting means connecting said axles to said frame intermediate said axles for transmitting braking and driving reactive forces to said frame and guiding the rear axle for swinging movement about a central vertical axis between said axles.

4. In a vehicle: a frame; supporting means for the frame comprising forward and rear tandem axles and load transmitting means interposed between the frame and axles, the forward axle being fixed against any substantial movement in a horizontal plane; spaced bearing pads carried by the rear axle; other pads reclining on said bearing pads and movable with respect thereto and associated with said load transmitting means; means including a tie rod connecting said other pads together; torque transmitting means connecting said axles to said frame intermediate said axles for transmitting braking and driving reactive forces to said frame and guiding the rear axle for swinging movement about a central vertical axis between said axles; and controllable means for locking the tie rod and rear axle together to prevent swinging of the latter during backing.

5. In a vehicle: a frame; supporting means for the frame comprising forward and rear tandem axles and load transmitting means interposed between the frame and axles, the forward axle being fixed against any substantial movement in a horizontal plane; bearing pads on the rear axle adjacent its ends; other pads reclining on said bearing pads and movable with respect thereto and associated with said load transmitting means; and torque transmitting means connecting said axles to said frame intermediate said axles for transmitting braking and driving reactive forces to said frame and guiding the rear axle for swinging movement about a central vertical axis between said axles.

6. In a vehicle: a frame; supporting means for the frame comprising tandem axles and parallel leaf springs interposed between the frame and axles, the forward axle being fixed against any substantial movement in a horizontal plane; spaced bearing pads carried by the rear axle; complementary pads carried by said springs for sliding movement over said bearing pads; torque transmitting means connecting said axles to said frame intermediate said axles for transmitting braking and driving reactive forces to said frame and guiding the rear axle for swinging movement about a central vertical axis between said axles; and controllable means for locking the rear axle parallel with the forward axle to prevent swinging of the former during backing.

7. In a vehicle: a bogie articulated to one end of said vehicle and provided with forward and rear tandem axles; means for securing the forward axle to said bogie against swinging movement relative thereto; and means for articulating the rear axle to said bogie for limited swinging movement substantially about the vertical axis of the bogie.

8. In a vehicle: a bogie secured to one end of said vehicle by means of a fifth wheel, said bogie comprising: a frame; supporting means for the frame including forward and rear tandem axles and load transmitting means interposed between the frame and axles, the forward axle being fixed with respect to the frame against any substantial movement in a horizontal plane; spaced bearing pads carried by the rear axle; other pads reclining on said bearing pads and movable with respect thereto and associated with said load transmitting means; means for holding said other pads in fixed spaced relation with respect to each other; torque transmitting means connecting said axles to said frame intermediate said axles for transmitting braking and driving reactive forces to said frame and guiding the rear axle for swinging movement about a central vertical axis between said axles; and controllable means for locking the rear axle parallel with the forward axle to prevent swinging of the former during backing.

9. A vehicle supported intermediate its ends by at least one axle fixed against any substantial movement in a horizontal plane and by a bogie articulated thereto through a fifth wheel; a forward axle fixed to said bogie against any substantial movement in a horizontal plane; and a rear exle articulated thereto for limited swinging movement substantially about the vertical axis of the bogie.

10. A vehicle supported intermediate its ends by at least one axle fixed against any substantial movement in a horizontal plane and by a bogie articulated thereto through a fifth wheel; a forward axle fixed to said bogie against substantial movement in a horizontal plane and a rear axle articulated thereto for limited swinging movement substantially about the vertical axis of the bogie; torque transmitting means connecting said axles to the bogie at a point intermediate said axles for transmitting braking and driving reactive forces to said bogie; and controllable means for locking said rear axle parallel with the forward axle to prevent swinging of the former during backing.

11. A vehicle supported intermediate its ends by at least one axle fixed against substantial movement in a horizontal plane and by a bogie secured to said vehicle through a fifth wheel, and including a frame; supporting means for the frame including forward and rear tandem axles and load transmitting means interposed between the frame and axles, said forward axle being fixed with respect to the frame against any substantial movement in a horizontal plane; spaced bearing pads carried by said rear axle; other pads reclining on said bearing pads and movable with respect thereto and associated with said load transmitting means; means for holding said other pads in fixed spaced relation with respect to each other; torque transmitting means connecting said axles to said frame intermediate said axles for transmitting braking and driving reactive forces to said frame and guiding the rear axle for swinging movement about a central vertical axis between said axles; and controllable means for locking the rear axle parallel with the forward axle to prevent swinging of the former during backing.

12. A vehicle supported at one end by a frame secured thereto by a fifth wheel and at its opposite end by a frame rigidly secured thereto, each of said frames including a pair of tandem axles, one of said axles being a fixed axle and the other being articulated to its frame for swinging movement about a vertical axis intermediate the two axles carried by said frame; and controllable means for locking the fixed axle in parallelism with the articulated axle.

13. A trailer supported at one end by a frame secured thereto by a fifth wheel and at its opposite end by a frame rigidly secured thereto, each of said frames comprising: tandem axles and load transmitting means interposed between the frame and axles, the forward axle being fixed with respect to said frame against substantial movement in a horizontal plane; spaced bearing pads carried by the rear axle; other pads reclining on said bearing pads and movable with respect thereto and associated with said load transmitting means; means for holding said other pads in fixed spaced relation with respect to each other; torque transmitting means connecting said axles to said frame intermediate said axles for transmitting braking and driving reactive forces to said frame and guiding the rear axle for swinging movement about a central vertical axis between said axles; and controllable means for locking the rear axle parallel with the forward axle to prevent swinging of the former during backing.

14. In a vehicle: a frame; supporting means for the frame comprising tandem axle housings and load transmitting means interposed between the frame and housings, the forward axle housing being fixed against substantial movement in a horizontal plane; spaced bearing pads carried by the rear axle housing; other pads reclining on said bearing pads and movable with respect thereto and associated with said load transmitting means; means for holding said other pads in fixed spaced relation with respect to each other; a differential housing carried by said rear axle housing; laterally spaced brackets depending from the frame intermediate said axle housings; a downwardly and arcuately curved guide member rigidly secured between said brackets; a wish-bone straddling the differential housing and secured at its bifurcated end to the rear axle housing and slidably secured at its other end to said guide member; and controllable means for locking the rear axle housing parallel with the forward axle housing to prevent swinging of the former during backing.

15. In a vehicle: a frame; supporting means for the frame comprising tandem axle housings and load transmitting means interposed between the frame and axle housings, the forward axle housing being fixed against substantial movement in a horizontal plane; spaced bearing pads carried by the rear axle housing; other pads reclining on said bearing pads and movable with respect thereto and associated with said load transmitting means; means for holding said other pads in fixed spaced relation with respect to each other; a differential housing carried by said rear axle housing; laterally spaced brackets depending from the frame intermediate said axle housings; laterally spaced torque rods extending between said brackets and the forward axle housing and flexibly connected thereto; a downwardly and arcuately curved guide member rigidly secured between said brackets; a wish-bone straddling the differential housing and secured at its bifurcated end to the rear axle housing and slidably secured at its other end to said guide member; and controllable means for locking the rear axle housing parallel with the forward axle housing to prevent swinging of the former during backing.

16. In a vehicle: a frame; supporting means for the frame comprising tandem axle housings and load transmitting means interposed between the frame and axle housings, the forward axle housing being non-steering; spaced bearing pads carried by the rear axle housing; other pads reclining on said bearing pads and movable with respect thereto and associated with said load transmitting means; means for holding said other pads in fixed spaced relation with respect to each other; a differential housing carried by said rear axle housing; an upwardly extending arm secured to said axle housing on each side of said differential housing; a downwardly extending arm secured to said axle housing on each side of said differential housing; laterally spaced brackets depending from the frame intermediate said axle housings; laterally spaced torque rods extending between said brackets and the forward axle housing and flexibly connected thereto; a downwardly and arcuately curved guide member rigidly secured between said brackets; a wish-bone straddling the differential housing and secured at its bifurcated end to said downwardly extending arms and slidably secured at its opposite end to said guide member; a second wish-bone secured at its bifurcated end to said upwardly extending arms and secured at its opposite end by means of a universal connection to said frame at a point intermediate said axle housings; and controllable means for locking the rear axle housing parallel with the forward axle housing to prevent swinging of the former during backing.

17. In a vehicle: a frame; supporting means for the frame comprising tandem axle housings and load transmitting means interposed between the frame and axle housings, the forward axle housing being non-steering; spaced bearing pads carried by the rear axle housing; other pads reclining on said bearing pads and movable with respect thereto and associated with said load transmitting means; a differential housing carried by said rear axle housing; an upwardly extending arm secured to said axle housing on each side of said differential housing; a downwardly extending arm secured to said axle housing on each side of said differential housing; laterally spaced brackets depending from the frame intermediate said axle housings; laterally spaced torque rods extending between said brackets and the forward axle housing and flexibly connected thereto; a downwardly and arcuately curved guide member rigidly secured between said brackets; a wish-bone straddling the differential housing and secured at its bifurcated end to said downwardly extending arms and slidably secured at its opposite end to said guide member; a second wish-bone secured at its bifurcated end to said upwardly extending arms and secured at its opposite end by means of a universal connection to said frame at a point intermediate said axle housings; an arcuate tie rod passing around the outer side of said differential housing and secured at its ends to said other pads; and controllable power-actuated means for moving said differential housing into a predetermined position relative to a fixed point on said arcuate tie rod and for locking said differential housing in said position.

18. In a vehicle: a frame; supporting means for the frame comprising tandem axle housings and load transmitting means interposed between the frame and axle housings, the forward axle housing being non-steering; spaced bearing pads carried by the rear axle housing; other pads reclining on said bearing pads and movable with respect thereto and associated with said load transmitting means; a differential housing carried by said rear axle housing; an upwardly extending arm secured to said axle housing on each side of said differential housing; a downwardly extending arm secured to said axle housing on each side of said differential housing; laterally spaced brackets depending from the frame intermediate said axle housings; laterally spaced torque rods extending between said brackets and the forward axle housing and flexibly connected thereto; a downwardly and arcuately curved guide member rigidly secured between said brackets; a wish-bone straddling the differential housing and secured at its bifurcated end to said downwardly extending arms and slidably secured at its opposite end to said guide member; a second wish-bone secured at its bifurcated end to said upwardly extending arms and secured at its opposite end by means of a universal connection to said frame at a point intermediate said axle housings; an arcuate tie rod passing around the outer side of said differential housing and secured at its ends to said other pads, said tie rod being provided intermediate its ends with a pair of laterally spaced guide members; a wedge-shaped locking member secured to said differential housing for vertical movement between said guide members, said locking member and guide members being so correlated that when the locking member is in one extreme position the tie rod and rear axle housing are free to swing relative to each other over a limited arc and as the locking member is moved to its other opposite extreme position it forces the tie rod to assume a symmetrical position with respect to the rear axle housing; and controllable power-operated means for actuating said locking member.

19. In a vehicle: a frame; supporting means for said frame including forward and rear tandem axles, the forward axle being fixed against any substantial movement in a horizontal plane; means for articulating the rear axle to said frame at a point intermediate said axles for limited swinging movement about said point; torque transmitting means connecting said axles to said frame at a point intermediate said axles for transmitting braking and driving reactive forces to said frame; and controllable means for locking the rear axle parallel with the forward axle to prevent swinging of the former during backing.

20. In a vehicle: a bogie articulated to one end of said vehicle and provided with forward and rear tandem axles; means for securing the forward axle to said bogie against swinging movement relative thereto; means for articulating the rear axle to said bogie for limited swinging movement substantially about the vertical axis of the bogie; and controllable means for locking said rear axle parallel with the forward axle to prevent swinging of the former during backing.

ALLYN L. AYERS.